March 19, 1929.  J. W. JACKSON  1,706,167
WHEEL STRUCTURE
Filed June 11, 1925
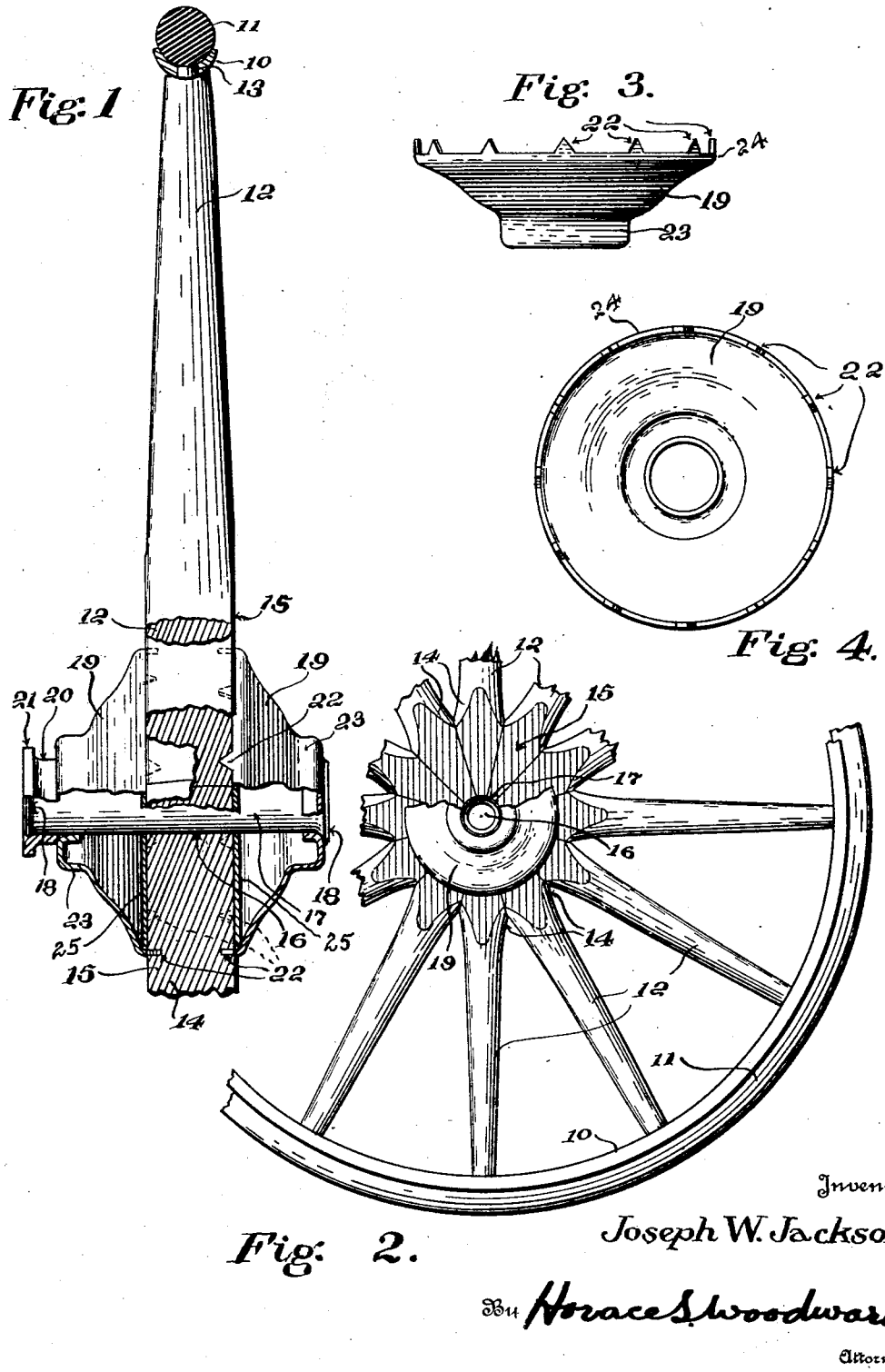
Inventor:
Joseph W. Jackson,
By Horace S. Woodward
Attorney Patented Mar. 19, 1929.

1,706,167

UNITED STATES PATENT OFFICE.

JOSEPH W. JACKSON, OF BROOKLYN, NEW YORK, ASSIGNOR OF ONE-HALF TO HENRY PERLMUTTER, OF BROOKLYN, NEW YORK.

WHEEL STRUCTURE.

Application filed June 11, 1925. Serial No. 36,399.

The invention has for an object to effect improvements in wheels of the type known to the trade as "juvenile," although it may be applied to many and varied uses for which wheels are required. It is a particular aim of the invention to present an improved form of wheel of the artillery type, which term is generally used to designate wheels in which spokes ordinarily of wood are employed, the inner ends of which are fitted together to form a continuous ring or nave, usually being slightly enlarged in the direction of the medial plane of the wheel.

A further important aim of the invention is to present a construction of wheel of this character which may be largely formed and assembled by machine operations. A further aim of the invention is to present a wheel construction in which the hub parts may all be formed of sheet metal, thereby facilitating quantity production of the article and the lowering of costs.

Additional objects, advantages and features of invention reside in the construction, arrangement and combination of elements involved in the embodiment of the invention, as may be more readily understood from the following description and accompanying drawings, wherein Figure 1 is a vertical cross sectional view of a wheel constructed in accordance with my invention.

Figure 2 is a fragmentary side elevation of such a wheel partly in section.

Figure 3 is a edge view of one of the hub plates.

Figure 4 is an elevation of the hub plate from the inner side.

There is illustrated a wheel comprising an ordinary "crescent" rim 10, suitably shaped to receive and retain a rubber tire in its outer channel, as at 11, this rim being radially apertured at suitable intervals to receive tenons 13 of spokes 12. Set within the rim there are radial spokes 12, of familiar form, their outer ends being tenoned to fit the apertures of the rim and afford a shoulder to abut the inner face of the rim snugly, while the inner ends of the spokes are slightly enlarged, as at 14, in the plane of of the wheel and have a sector shape, radial planiform faces on the inner ends of mutually adjacent spokes abutting each other, so as to form a continuous built-up ring element or nave 15 at the center of the wheel. The lateral outer faces of the spokes are parallel and planiform, in the present instance, though they may be otherwise shaped as found desirable. An axial opening 16 is drilled through the inner nave 15, and set snugly in this opening there is a box sleeve or thimble 17 formed of sheet metal as is familiar in the art of metal wheels. This thimble is upset at its extremities as at 18, so as to retain thereon hub elements, as shown. At one end, a hub side plate 19 of circular form, which is pressed to a substantial frusto-conical or dished form, has its rim set against the nave portion 14 of the wheel and its central outer apertured portion engaged snugly around the thimble 17 against and confined by the upset end thereof. At the opposite side of the wheel a similar plate 19 is similarly engaged with the nave of the wheel, but has interposed between its outer part and the respective adjacent upset end of the thimble a wear ring or collar 20 with a circumscribing planiform flange 21 at its outer end.

At the abutment of the plates 19 with the nave of the wheel which will be termed the base edges of the plates, the plates 19 are formed with a multiplicity of spurs or points 22, V-shaped and embedded in the material of the spokes, the edge portions of the plates 19 between these parts snugly abutting the lateral surfaces of the wheel nave.

The wheel as first described may of course be modified in various ways to form an ornamental commercial article, or to incorporate any usual expedients known in the art which are adaptable thereto. In the present instance, the plates 19 have an ogee curve therein between the point of abutment with the wheel nave and their outer parts, as viewed in cross section, and a short cylindrical ornamental "point-ring" portion 23 is formed outwardly thereof, while the extreme edge portion of the point is recurved and extended inward so that the recurved portion affords a substantial bearing on the thimble 17 and also conforms to the curve of the upset portion of the thimble end. The rim portion 24 of the plate 19 also is pressed to cylindrical form for a short distance from the bases of the points 22, and the points are extended as a continuation of the cylindrical portion, the edges of the plate between the points being finished smoothly in a common plane. These points are formed customarily about three-sixteenths of an inch from the bases of their apices for the size shown in Figure 1, and are each at least one-eighth to an inch in width at the base. It is important that these points have a substantial width at the base, although the proportions may be modified to some extent from that specifically indicated. In the present instance, the number of points 22 corresponds to the number of spokes, but it may be found preferable to use a larger number.

It should be noted that the steel used has a measure of resilience, and in the pressing of the plates 19 to their places, and upsetting the ends of the box thereagainst, the plates are put under strain, whereby in case of drying out of the wood, or if slight working of the wood between the plates occurs, the tendency to development of a loose fit will be offset and compensated for.

There is a washer or annular plate 25 between the plate 19 and the nave 15, on each side. This plate should fit snugly within the bases of the points and set flush with the edge of the plate 19 between the points. The plates 19 are formed so that they will bear snugly on the edges of the plates 25 and press the latter forcibly against the butts of the spokes. The pressure applied in embedding the points 22 in the nave also serves to press the butts of the spokes into good alinement between the plates 25.

It may be unnecessary to use adhesive between the butts of the spokes when the plates 25 are used, the economy thus effected offsetting the cost of additional material in the plate 25, the operations for producing and placing the plate being negligible.

I claim:

A wheel of the character described comprising spokes having butts forming a nave portion, a co-axial box snugly fitted therethrough, substantially cup-like conical resilient side plates having bases at right angles to their axes and their extreme edges set in the material of the nave and confined under strain by compression between the ends of the box, and an annular planiform plate snugly fitted within the said side plates and against the bases of the spokes and being engaged by the side plates in confining relation with the bases of the spokes for the purpose described.

In testimony whereof I affix my signature.

JOSEPH W. JACKSON.